United States Patent [19]
Goodman et al.

[11] Patent Number: 6,011,577
[45] Date of Patent: *Jan. 4, 2000

[54] MODULAR OPTICAL PRINT HEAD ASSEMBLY

[75] Inventors: Douglas S. Goodman, Sudbury; William T. Plummer, Concord; Jeffrey W. Roblee, Watertown, all of Mass.

[73] Assignee: Polaroid Corporation, Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/885,260

[22] Filed: Jun. 30, 1997

[51] Int. Cl.⁷ ...................................................... B41J 2/235
[52] U.S. Cl. ........................... 347/259; 347/241; 347/242; 347/243; 347/256; 347/257; 347/259
[58] Field of Search .................................... 347/241, 242, 347/244, 245, 256, 257, 258, 259, 263, 243; 359/196, 205, 853, 896

[56] References Cited

U.S. PATENT DOCUMENTS

| | | |
|---|---|---|
| 4,518,232 | 5/1985 | Dagenais ................... 359/853 |
| 4,800,401 | 1/1989 | Sato et al. ................. 347/245 |
| 5,134,511 | 7/1992 | Shiraishi et al. ........... 359/196 |
| 5,245,481 | 9/1993 | Kaneko et al. ............. 359/896 |
| 5,331,343 | 7/1994 | Ono et al. ................. 347/257 |
| 5,479,201 | 12/1995 | Sugiura et al. ............ 347/242 |
| 5,615,198 | 3/1997 | Kubokawa ................ 369/102 |
| 5,652,670 | 7/1997 | Hayashi .................... 359/205 |
| 5,771,061 | 6/1998 | Komurasaki et al. ...... 347/257 |
| 5,784,094 | 7/1998 | Ota et al. .................. 347/243 |

FOREIGN PATENT DOCUMENTS

0 703 088 A2  3/1996  European Pat. Off. .
WO 92 10049  6/1992  WIPO .

Primary Examiner—N. Le
Assistant Examiner—Hai C. Pham
Attorney, Agent, or Firm—Barry Gaiman; Joseph Stecewycz

[57] ABSTRACT

Disclosed is a laser print head, suitable for use with a recording medium, comprising a print head base comprising a plurality of mounting surfaces, one or more optical radiation source removably affixed to a first base mounting surface, at least one collimating lens, at least one focusing lens affixed to a second base mounting surface, a preobjective lens affixed to a third base mounting surface; an objective lens, and one or more optional mirror facets.

23 Claims, 9 Drawing Sheets

MODULAR OPTICAL PRINT HEAD ASSEMBLY

CROSS REFERENCE TO RELATED APPLICATION

This application is related to commonly-assigned and concurrently-filed U.S. patent application Ser. No. 08/885,637, filed on Jun. 30, 1997, entitled, "Monolithic multi-faceted mirror for combining multiple beams from different light sources by reflection, now a U.S. Pat. No. 5,933,278."

BACKGROUND OF THE INVENTION

1. Field of the Invention

This invention in general relates to the field of laser printing systems and, more specifically, to a modular optical print head which provides for the replacement of or interchange of laser component assemblies without requiring optical realignment.

2. Description of the Prior Art

The use of lasers, especially laser diodes, in optical print heads wherein pulses of optical radiation are utilized to produce an image or graphics, is well known. In a typical application, an image is produced by the scanning of the optical radiation across a suitable receptor medium. By way of example, the image may comprise alphanumeric characters or a graphical image formed either in gray scale or in color.

Laser diodes are advantageous for use in such applications because of their small size, high efficiency, and remarkable durability. Nevertheless, the use of laser diodes might be more widespread if not for their low power output (typically a few milliwatts), poor spatial quality, and relatively small number of output wavelengths. As a result, the use of laser diodes has been largely limited to applications which do not require a high intensity uniform source at one of the available output wavelengths.

As a consequence, a typical laser print head may utilize multiple laser diodes to provide an amount of radiative power suitable for achieving an acceptable printing speed. In U.S. Pat. No. 5,355,303 "Printing apparatus" issued to Ferla et al. and commonly assigned herewith, for example, there is disclosed a scanning print head comprising a plurality of radiation sources, or lasers.

It can be appreciated that the complexities associated with the alignment of a single-laser printing system are proportionately increased with a conventional multiple-laser printing system. Moreover, if one or more lasers fail while the printing system is in use, replacement will usually require realignment of each optical path, a complicated and time-consuming task.

While the art describes a variety of devices that utilize laser devices for printing, there remains a need for improvements that offer advantages and capabilities not found in presently available instruments, and it is a primary object of this invention to provide such improvements.

It is another object of the present invention to provide a laser print head device in which assembly and alignment are simplified.

It is another object of the invention to provide such a device and method in which individual laser units are replaceable or interchangeable without requiring optical realignment.

Other objects of the invention will be obvious, in part, and, in part, will become apparent when reading the detailed description to follow.

SUMMARY OF THE INVENTION

The present invention results from the observation that certain critical mounting surfaces can be precisely formed onto one side of a monolithic print head base upon which a laser print head device is assembled. The present application discloses a laser print head comprising the print head base, one or more sources of optical imaging radiation, and radiation conditioning optics such that the optical imaging radiation can be formatted to produce an image on a recording medium. Other features of the invention will be readily apparent when the following detailed description is read in connection with the drawings.

BRIEF DESCRIPTION OF THE DRAWINGS

The structure and operation of the invention, together with other objects and advantages thereof, may best be understood by reading the detailed description to follow in connection with the drawings in which unique reference numerals have been used throughout for each element and wherein.

DESCRIPTION OF THE PREFERRED EMBODIMENTS

Figure 1:
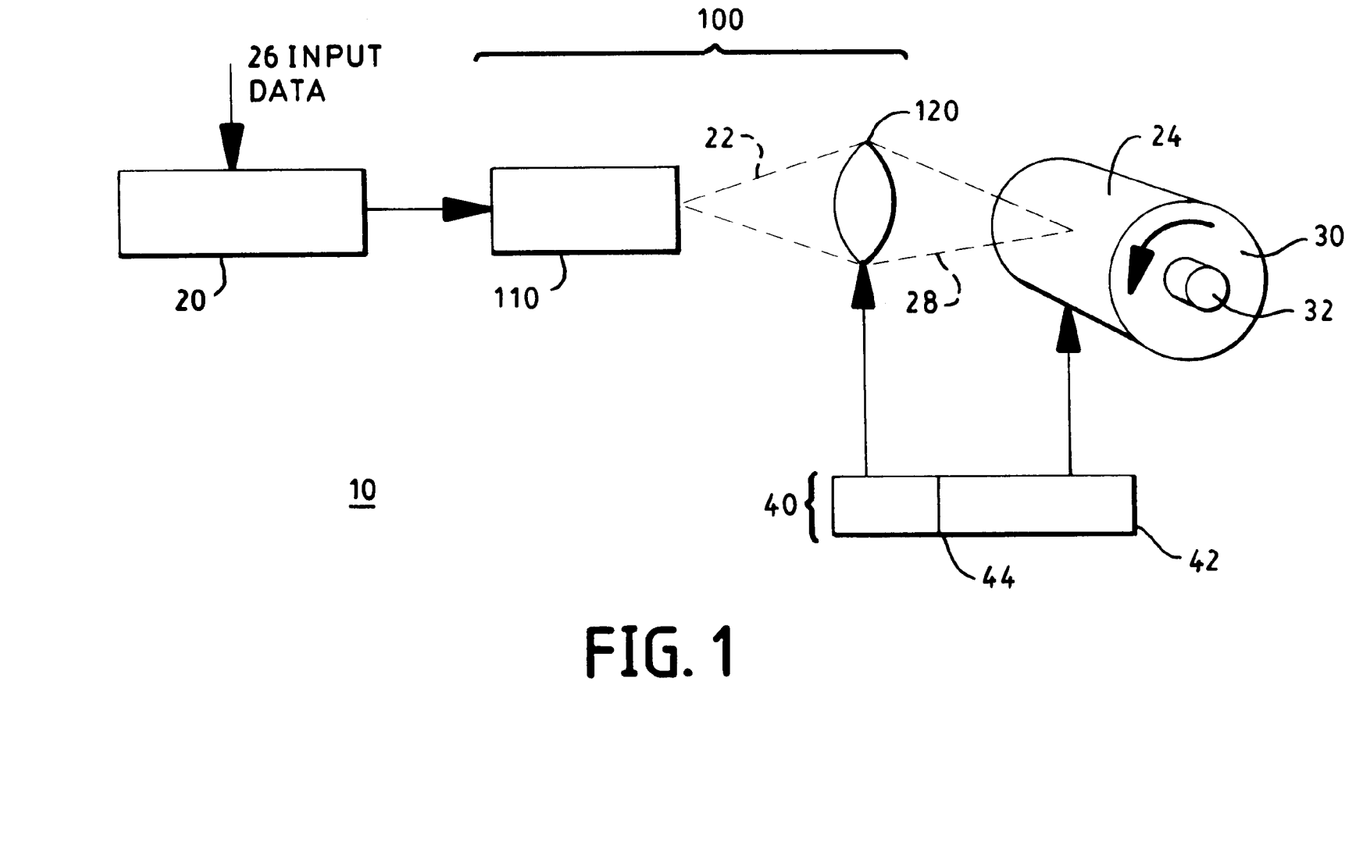
FIG. 1 is simplified diagrammatical view of a laser printing system comprising a laser print head, in accordance with the present invention, and a laser current driver for supplying power to the laser print head.

There is shown in FIG. 1 a laser printing system 10 comprising a laser print head 100, in accordance with the present invention, and a laser current driver 20 for supplying power to laser print head 100. Laser print head 100 provides optical radiation 22 for imprinting an image on a recording medium 24 in response to a set of input data 26. Recording medium 24 may be any suitable imaging medium such as, for example, a photosensitive medium or a thermal medium such as disclosed in U.S. Pat. No. 5,155,003 "Thermal imaging medium" issued to Chang. When laser printing system 10 is used in the medical arts, for example, input data 26 may be obtained by instrumentation such as an x-ray unit, a CAT scanner, a magnetic resonance imager, ultrasound equipment, or the like. Alternatively, input data 26 need not be provided in real time but may be an analog or digital image which is retrievably stored using optical or magnetic tape or disk, solid-state memory, or other storage methods.

Laser print head 100 comprises laser 110 and an optical system 120 which serves to bring optical radiation 22 into focus onto recording medium 24 as an imaging beam 28. By way of example, recording medium 24 may be secured to a drum 30 which is rotatable about an axis 32. A printing control apparatus 40 comprises a scanner 42, which serves to translate optical system 120 in synchronism with the rotation of drum 30 whereby imaging beam 28 is scanned along medium 24 to produce the desired image, and an autofocus mechanism 44, which serves to adjust one or more components of optical system 120 so as to maintain imaging beam 28 in focus on medium 24.

Figure 2:
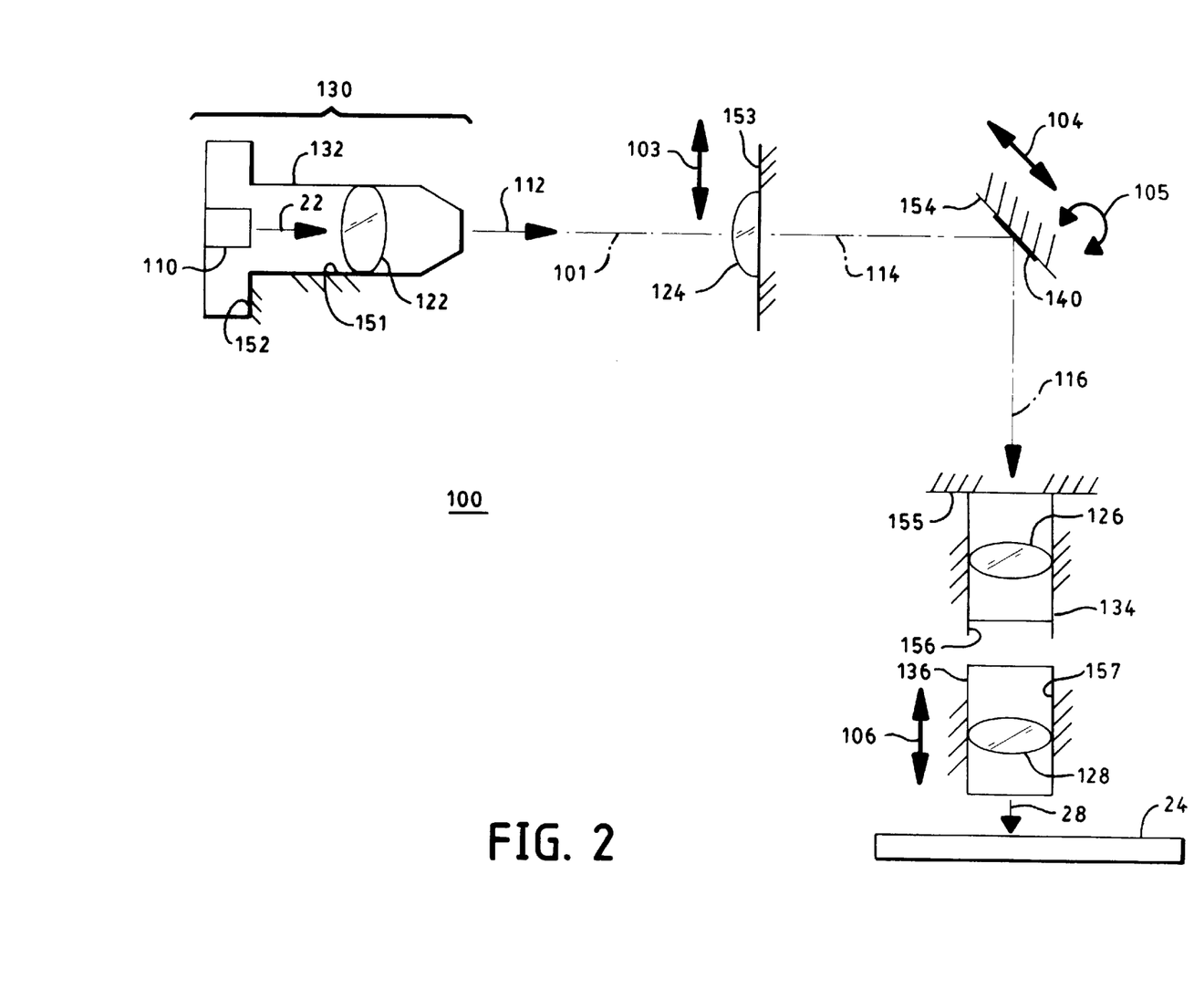
FIG. 2 is a simplified diagram showing the optical path traversed by imaging radiation emitted by an illuminator, the radiative source of the laser print head of FIG. 1, to an imaging medium.

In the present invention, the optical path from the source of imaging radiation to the imaging medium can be represented diagrammatically as shown in FIG. 2. Imaging radiation is provided by an illuminator 130 which comprises a housing 132, laser 110, and collimating optics, here represented by a collimating lens 122. Optical radiation 22 emitted by laser 110 passes through collimating lens 122 and emerges from illuminator 130 as collimated radiation 112 as explained in greater detail below. By collimated radiation it is meant that laser module 130 forms, at infinity, a nearfield image of laser 110.

Collimated radiation 112 passes through a focusing lens 124 which serves to focus converging radiation 114 onto an optional mirror facet 140. In a preferred embodiment, laser print head 100 comprises more than one illuminator 130. Accordingly, mirror facets 140 are used to bend the paths of converging radiation 114, from corresponding illuminators 130, and direct all reflected radiation 116 to recording medium 24. Reflected radiation 116 passes through a pre-objective lens 126, which serves to demagnify the nearfield image of laser 110, and an objective lens 128, which serves to reimage the nearfield image onto recording medium 24. In a preferred embodiment, the front focal plane of pre-objective lens 126 lies at the plane of mirror facet 140 and objective lens 128 comprises an aspheric element which forms a real image of the nearfield of laser 110 at the plane of recording medium 24. Preferably, pre-objective lens 126 and objective lens 128 are configured such that their combined imaging is telecentric.

The optical alignment of laser print head 100 is facilitated in the present invention by means of a plurality of fixed mounting surfaces. Each mounting surface is precisely located and fixed with respect to the other mounting surfaces and thus serves to pre-establish certain of the positional settings determined in the process of optically aligning laser print head 100. As explained in greater detail below, each component of laser print head 100, with the exception of objective lens 128, is affixed to one or more of these mounting surfaces. The mounting surfaces serve to selectively constrain the corresponding affixed component by limiting the degrees of freedom of the component such that: i) there is not allowed movement of the component with respect to one or more pre-established optical alignment settings, and ii) there may be allowed movement of the component with respect to one or more of the optical alignment adjustments performed during assembly of laser print head 100.

Illuminator 130 is constrained from movement by a mounting surface 151 and a mounting surface 152. Mounting surface 151 serves to align a radiation propagation axis 101 with the optical axis of focusing lens 124. Mounting surface 152 serves to position illuminator 130 along the path of collimated radiation 112 with respect to focusing lens 124. In a preferred embodiment focusing lens 124 is a plano-convex lens with the planar side against a mounting surface 153. Mounting surface 153 constrains focusing lens 124 along the path of collimated radiation 112 with respect to illuminator 130 and maintains the optical axis of focusing lens 124 in parallel relationship to propagation axis 101, but allows movement in the plane of mounting surface 153 in directions transverse and lateral to propagation axis 101, as indicated by double arrow 103. The transverse and lateral movements provide for adjustment in the alignment of the optical axis of focusing lens 124 with propagation axis 101. After focusing lens 124 has been aligned, collimated radiation 112 is imaged at the rear focal plane of focusing lens 124. The imaging is telecentric, and the numerical apertures in the two principal meridians are approximately equal.

Mirror facet 140 is constrained to lie in the path of converging radiation 114 by a mounting surface 154 as explained in greater detail below. Mounting surface 154 allows for movement of mirror facet 140 into and out of the path of converging radiation 114, as indicated by double arrow 104, and allows for the rotation of mirror facet 140 with respect to converging radiation 114, as indicated by double arrow of rotation 105. Movement into and out of the path of converging radiation 114 provides for the positioning of mirror facet 140 so as to achieve an optical adjustment whereby the nearfield image of laser 110 is clipped on both ends by mirror facet 140. The rotational movement provides for alignment of propagation axis 101 of reflected radiation 116 with respect to pre-objective lens 126.

Pre-objective lens 126, which is preferably affixed to a housing 134, is constrained from movement by a mounting surface 155 and a mounting surface 156. Mounting surface 155 constrains pre-objective lens 126 from movement along the path of reflected radiation 116 with respect to mirror facet 140, and mounting surface 156 serves to align the optical axis of pre-objective lens 126 with propagation axis 101 of reflected radiation 116. Objective lens 128 is affixed to a housing 136 and is constrained to move along propagation axis 101 of imaging beam 28 by mounting surface 157, as indicated by double arrow 106. Housing 106 is, in turn, affixed to autofocus mechanism 44 (not shown) which serves to maintain imaging beam 28 in focus on recording medium 24.

Figure 3:
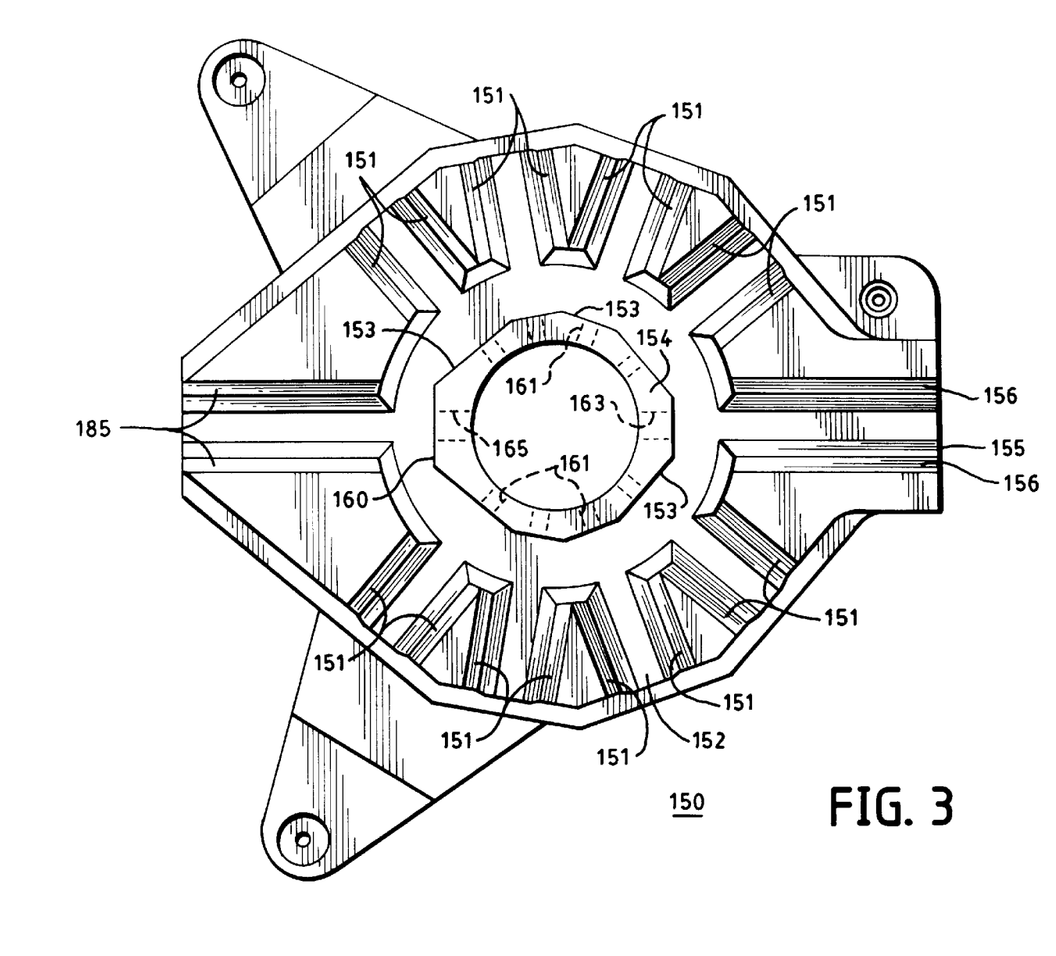
FIG. 3 is a plan view of a laser print head base, in accordance with the present invention.
Figure 4:
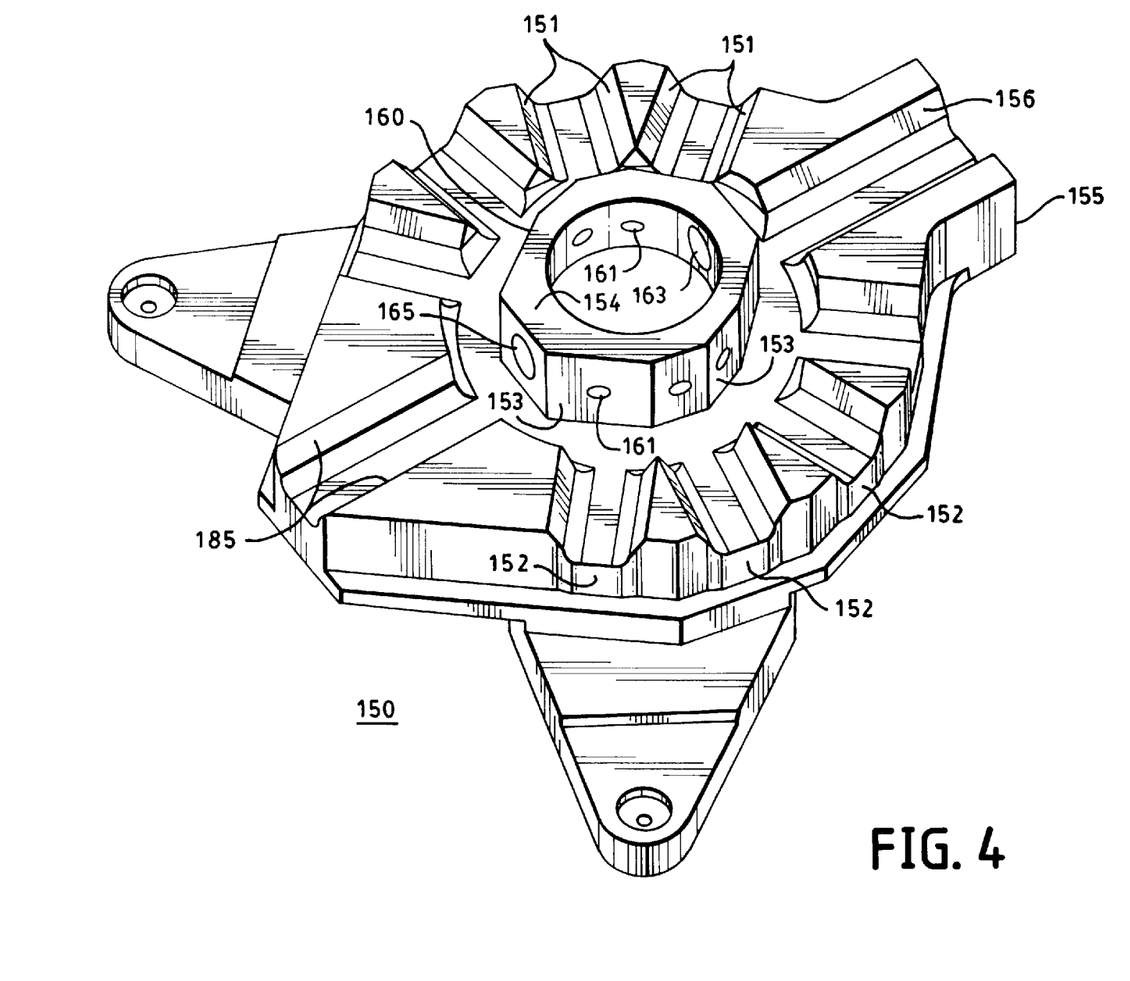
FIG. 4 is an isometric view of the laser print head base of FIG. 3.

In a preferred embodiment, mounting surfaces 151 through 156 are provided on a print head base 150, as best seen in FIGS. 3 and 4. In the example given, there are provided mounting surfaces to accommodate up to eight illuminators 130 (not shown for clarity). Eight corresponding mounting surfaces 151 are configured as vee-shaped grooves, described in greater detail below. Mounting surfaces 152 are flat surfaces preferably perpendicular to the axes of the vee-shaped grooves of corresponding mounting surfaces 151.

Print head base 150 comprises a centrally-located mesa-like ring 160 upon which are located a plurality of mounting surfaces 153, one mounting surface 153 for each illuminator used in the assembly. Each mounting surface 153 is perpendicular to the axis of the vee-shaped groove of a corresponding mounting surface 151. There is provided a hole 161 within each mounting surface 153 and extending through ring 160 to allow for the passage of imaging radiation between illuminator 130 (not shown) and a corresponding mirror facet 140 (not shown). Mounting surface 154, which defines the top surface of ring 160, forms a plane perpendicular to mounting surfaces 153.

Ring 160 further comprises an opening 163 to allow for the passage of imaging radiation between a mirror facet 140 (not shown) and a corresponding pre-objective lens 126 (not shown). Mounting surface 156 comprises a vee-shaped groove extending from and essentially in line with opening 163. Mounting surface 155 is a flat surface preferably perpendicular to the axis of the vee-shaped groove of mounting surface 156. In an alternative embodiment, ring 160 may further comprise an opening 165 for use in the procedure of optically aligning laser print head 100. Opening 165 is used in conjunction with an alignment and assembly setup fixture (not shown) which interfaces with a mounting surface 185, comprising a vee-shaped groove, extending from and located essentially in line with opening 165.

In a preferred embodiment, print head base 150 is machined from a single unit (e.g., a casting or block of material). As can be appreciated by one skilled in the relevant art, all critical mounting surfaces 151 through 156 are located on the upper side of print head base 150 and can, therefore, be machined without repositioning the work piece. Consequently, the resultant precision of mounting surfaces 151 through 156, as well as of assembled laser print head 100, is superior to that of conventional print heads, and this precision allows for replacement of component lasers without incurring a need for optical realignment.

Figure 5:
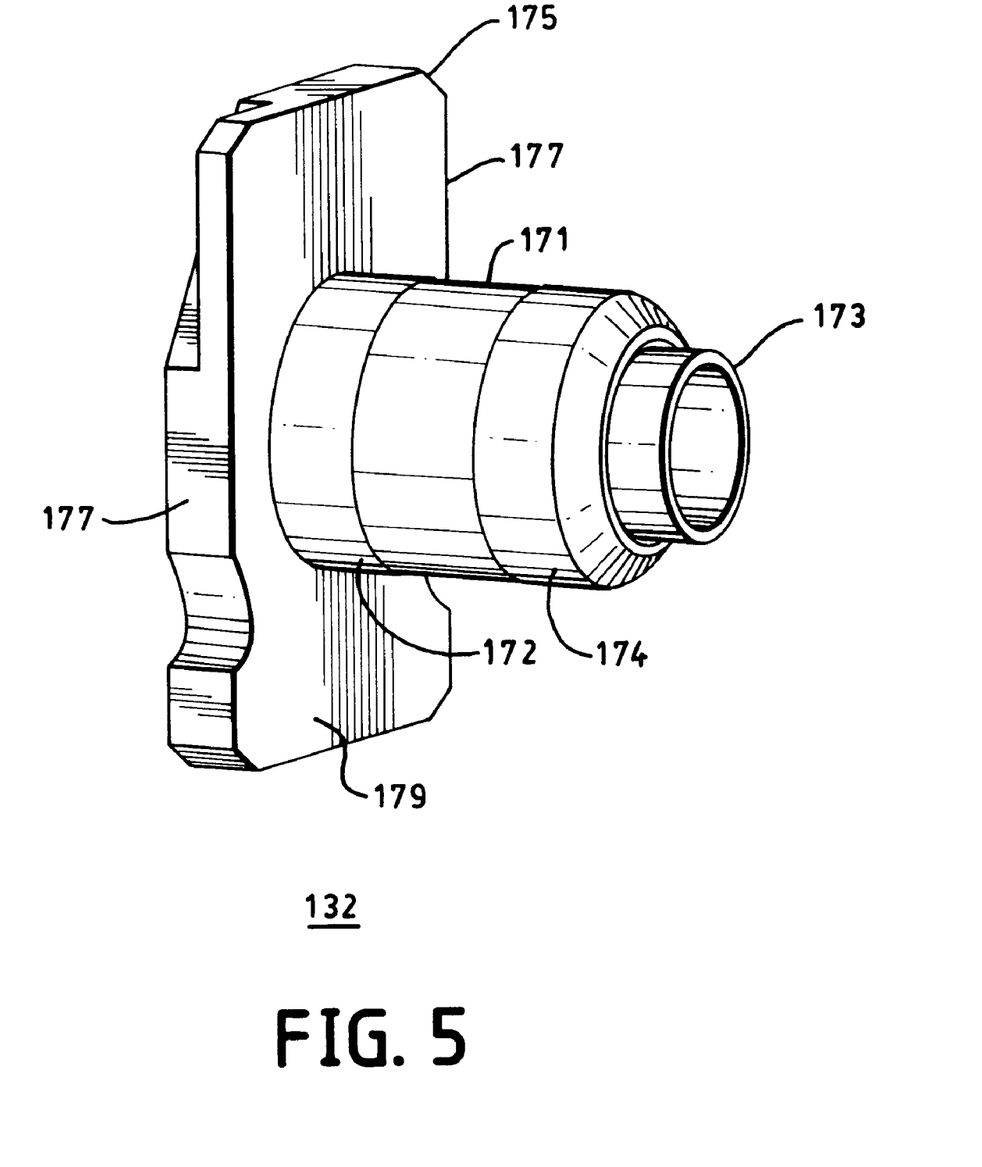
FIG. 5 is an isometric view of an illuminator, in accordance with the present invention, configured to replaceably mount onto the print head base of FIG. 3.
Figure 6:
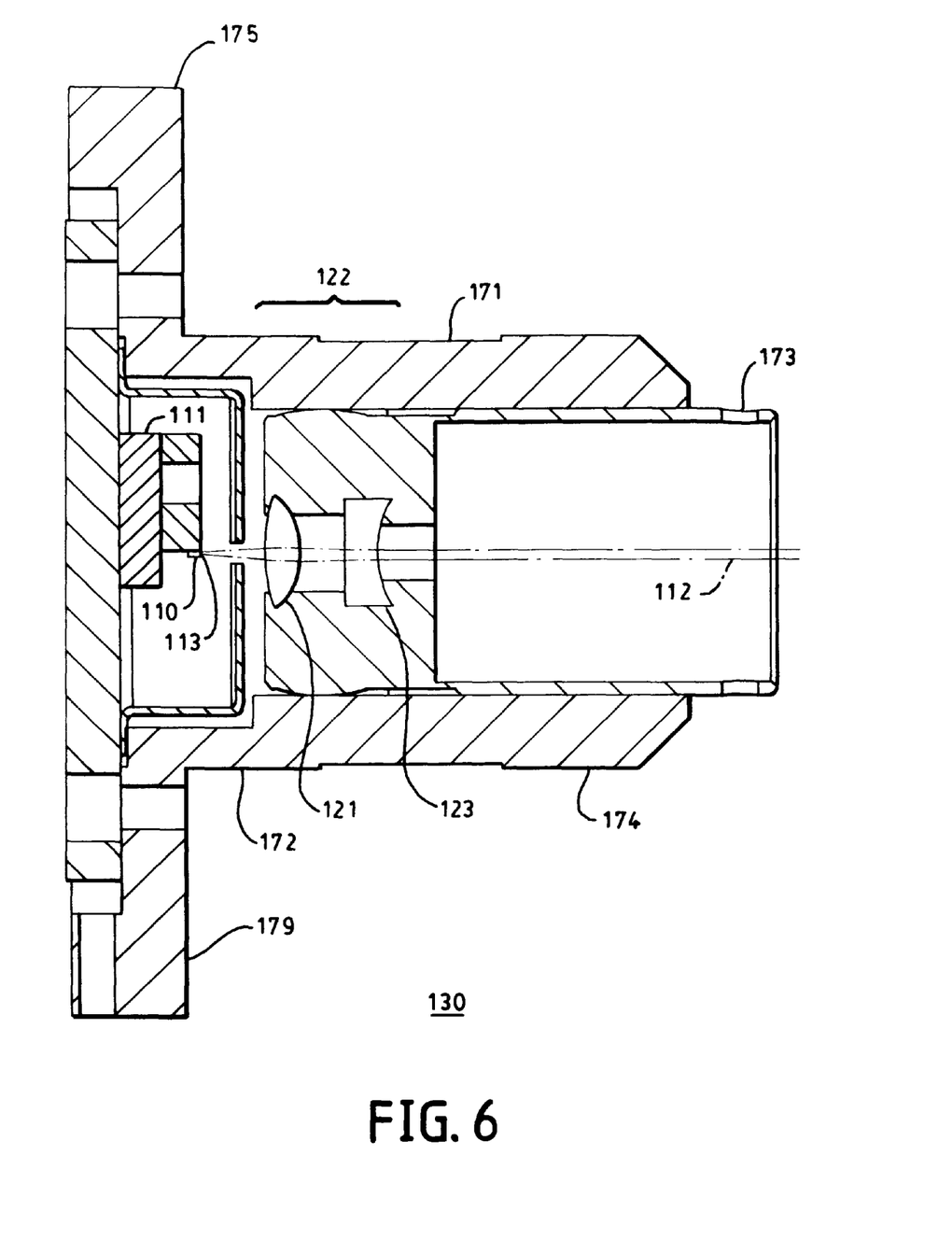
FIG. 6 is a cross-sectional view of the illuminator of FIG. 5 showing an enclosed laser and optical elements used to produce a collimated output beam.

FIGS. 5 and 6 provide further detail as to the preferred construction of an illuminator 130. Housing 132 comprises a barrel section 171 and a flange section 175. Barrel section 171 comprises two raised cylindrical mating surfaces 172 and 174 which contact mounting surface 151 (not shown) when placed into a corresponding vee-shaped groove upon assembly. Flange 175 comprises parallel and opposing side surfaces 177 which serve to further align illuminator as explained in greater detail below. A front surface 179 of flange 175 contacts mounting surface 152 (not shown) when barrel section 171 is positioned against mating surface 151 upon assembly.

Laser 110 is mounted on a heat sink 111 and preferably comprises a cylindrical microlens 113 lying parallel to the output facet of laser 110 in the path of emitted radiation. As is well-known in the relevant art, microlens 113 reduces the divergence of the radiation in one meridian so that the divergences in both meridians are approximately the same. Within barrel section 171 there is an adjustable sleeve 173 which serves to retain and provide for the alignment of collimating lens 122 as illuminator 130 is assembled. In a preferred embodiment, collimating lens 122 comprises a bi-convex lens 121 and a plano-cylindrical lens 123. Bi-convex lens 121 serves to collimate the emitted radiation in one meridian and plano-cylindrical lens 123 serves to remove the residual astigmatism and produce collimation in the other meridian.

Figure 7:
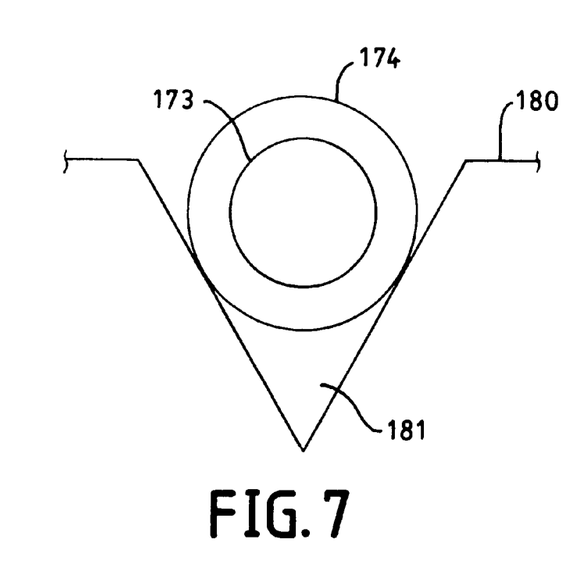
FIG. 7 is a simplified diagram illustrating emplacement of the illuminator of FIG. 5 into an alignment fixture.
Figure 8:
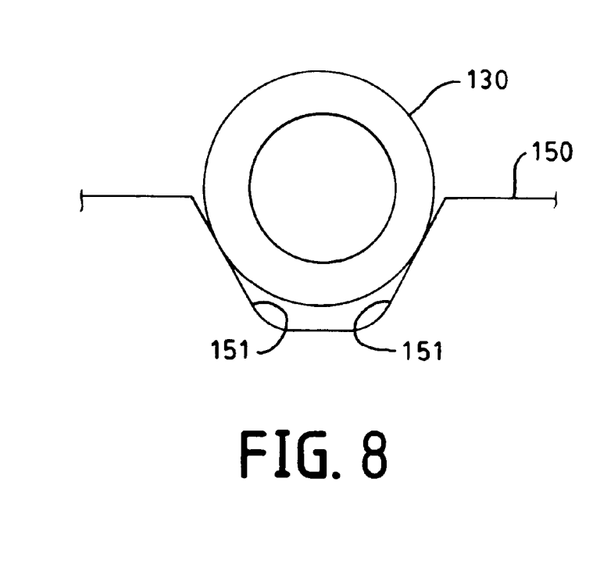
FIG. 8 is a simplified diagram illustrating placement of the illuminator of FIG. 5 onto the print head base of FIG. 3.

As illuminator 130 is assembled, sleeve 173 is free to slide and rotate within barrel 171. These movements allow for the positional adjustment of bi-convex lens 121 and plano-cylindrical lens 123 so as to align collimated radiation 112 with the axes of raised cylindrical mating surfaces 172 and 174. In a preferred embodiment, this adjustment is made by placing illuminator 130 into a fixture 180 comprising a channel 181 as shown in FIG. 7 and aligning collimated radiation 112 with the axis of channel 181. Thus, when illuminator 130 is placed into contact with mating surface 151, as shown in FIG. 8, collimated radiation will be aligned with the axis of surface 151. In a preferred embodiment, the sides of channel 181 and the faces of mounting surface 151 form a 60° angle, and the axes of channel 181 and of the vee-shaped groove comprising mounting surface 151 are equivalent to the longitudinal axis of a one inch cylinder placed into channel 181 and into mounting surface 151.

Figure 9:
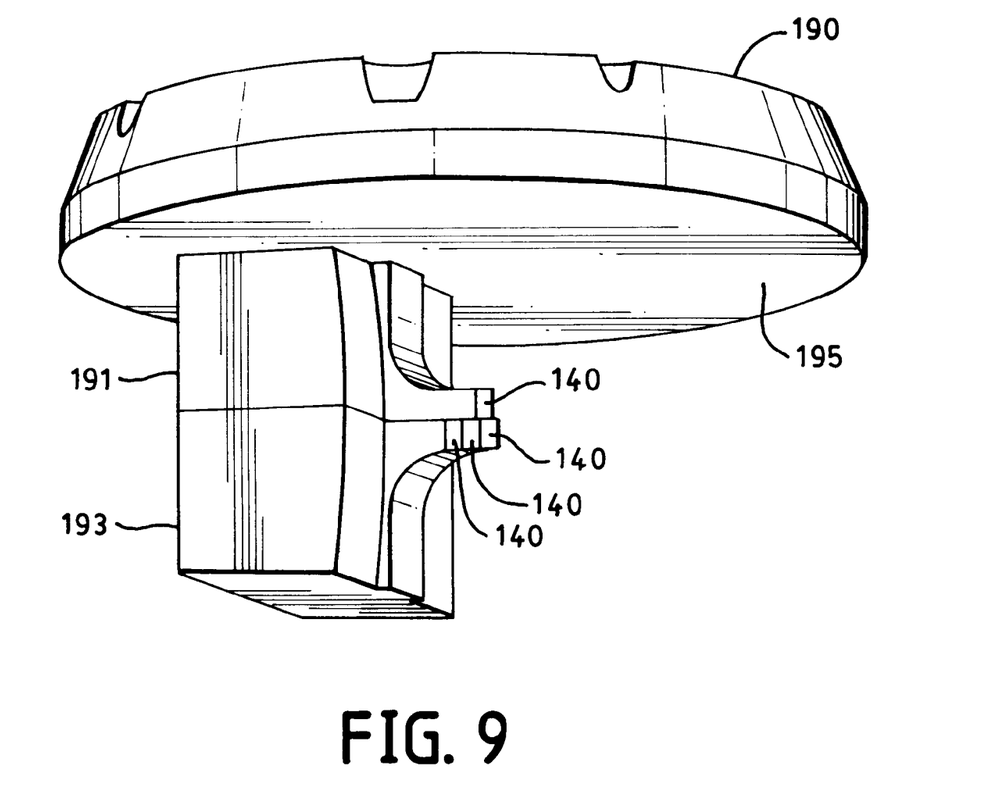
FIG. 9 is an isometric view of a mirror base comprising a plurality of mirror facets and configured for attachment to the print head base of FIG. 3.

Mirror facets 140 are supported by a mirror base 190 comprising an upper pedestal 191 and a lower pedestal 193, as best seen in FIG. 9. In the configuration shown, there are provided eight mirror facets 140 in accordance with a preferred embodiment comprising eight illuminators. Upper pedestal 191 comprises two mirror facets 140 (where one is hidden from view) and lower pedestal 193 comprises the remaining six mirror facets 140 (where three are hidden from view). The underside of mirror base 190 comprises a surface 195 which is affixed to mounting surface 154 (not shown) during assembly of laser print head 100. The dimensions from surface 195 to mirror facets 140 are determined so as to position mirror facets 140 in the path of converging radiation 114 as explained above. In an alternative embodiment, laser print head 100 comprises a single illuminator affixed to mounting surface 185, as best seen in FIG. 3. In this embodiment, there is provided a direct optical path between illuminator 130 and pre-objective lens 126. Consequently, such an embodiment will comprise no mirror facets 140 and will not require a mirror base 190.

The imaging pattern formed on recording medium 24 will be determined by the relative orientation of each mirror facet 140. A more comprehensive description of mirror base 190 including alternative mirror facet configurations is provided in patent application Ser. No. 08/885,637, filed on even date herewith, commonly assigned, and incorporated herein by reference.

Figure 10:
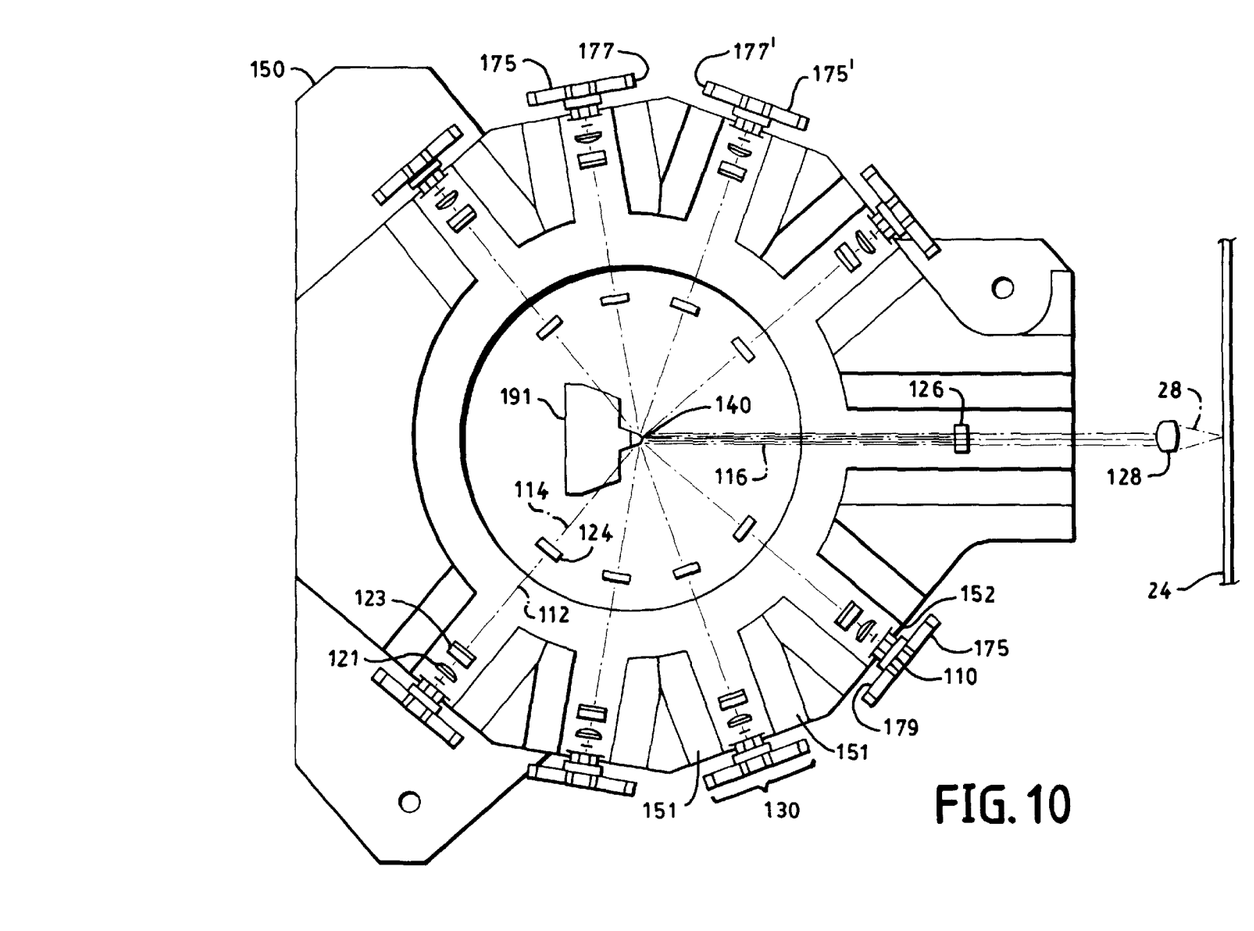
FIG. 10 is a diagram superimposing the optical paths of a plurality of the illuminators of FIG. 5 onto the plan view of the laser print head base of FIG. 3, to illustrate the relative placement of primary laser print head components according to the present invention.

When assembled and aligned in accordance with the present invention, the primary components comprising laser print head 100 will be located in the relative positions shown in the simplified diagram of FIG. 10. Each illuminator 130 is positioned in a vee-shaped groove affixed to a respective surface 151 of print head base 150. Flange 175 of each illuminator 130 is positioned with front surface 179 against a respective mounting surface 152. For purposes of clarity, the spacing between adjacent illuminator housing flanges 175 has been exaggerated. Thus, with reference to the upper region of print head base 150 in FIG. 10, there is essentially no gap between side surface 177 of flange section 175 and adjacent side surface 177' of flange section 175'. Accordingly, upon assembly, each illuminator 130 is oriented with side surfaces 177 of the corresponding flange section 175 perpendicular to the upper side of print head base 150. This serves to maintain the proper relative orientation of plano-cylindrical lens 123 in illuminator 130, as described above and shown in FIG. 6. It can be appreciated by one skilled in the relevant art that a laser print head 100 fabricated and assembled in accordance with the present invention provides for interchange or replacement of one or more illuminators 130 without requiring a subsequent optical realignment.

Optical radiation emitted by laser 110 passes through bi-convex lens 121 and plano-cylindrical lens 123 and impinges on focusing lens 124 as collimated radiation 112. (Note that ring 160 has been omitted from FIG. 10 for clarity.) Converging radiation 114 is incident upon a respective mirror facet 140 supported by upper pedestal 191 or lower pedestal 193. Reflected radiation 116 passes through pre-objective lens 126 and is brought into focus on recording medium 24 as imaging beam 28 by means of objective lens 128. Objective lens 128 is affixed to autofocus mechanism 44 (not shown) as explained above.

It can be further appreciated by one skilled in the relevant art that the imaging beam of radiation produced in laser print head 100 is relatively large over much of its path of propagation in comparison to the emitting region of laser 110, approximately $1 \times 100$ $\mu$m in the preferred embodiment, and to the imaging region at recording medium 24, approximately 3×30 μm in the preferred embodiment. As a result, the design of laser print head 100 allows for greater assembly tolerances over the intermediate part of the optical path.

While the invention has been described with reference to particular embodiments, it will be understood that the present invention is by no means limited to the particular constructions and methods herein disclosed and/or shown in the drawings, but also comprises any modifications or equivalents within the scope of the claims.

What is claimed is:

1. An optical print head, suitable for use with a recording medium, said print head comprising:
    a print head base comprising a plurality of mounting surfaces;
    at least a first optical radiation source removably affixed to a first said base mounting surface;
    a first collimating lens disposed in the optical path of said first optical radiation;
    a first focusing lens mounted to a second said base mounting surface, said first focusing lens disposed in the optical path of said first optical radiation;
    at least a second optical radiation source removably affixed to a third said base mounting surface;
    a second collimating lens disposed in the optical path of said second optical radiation;
    a second focusing lens mounted to a fourth said base mounting surface, said second focusing lens disposed in the optical path of said second optical radiation; and,
    an objective lens disposed between said first and second optical radiation sources and the recording medium;
    at least a first mirror facet disposed to reflect said first optical radiation to said objective lens, said first mirror facet fixed with respect to said print head base, and
    at least a second mirror facet, disposed to reflect said second optical radiation to said objective lens, in a direction substantially parallel to said reflected first optical radiation, said second mirror facet fixed with respect to said print head base.

2. The print head of claim 1 wherein said objective lens has at least a degree of freedom with respect to said first mirror facet to provide for optical alignment of said optical print head.

3. The print head of claim 1 wherein said first focusing lens has at least a degree of freedom in a direction transverse to the optical path of said first optical radiation to provide for optical alignment of said optical print head.

4. The print head of claim 1 wherein said objective lens comprises an aspheric element.

5. The print head of claim 1 further comprising a pre-objective lens, said pre-objective lens forming a telecentric system with said objective lens.

6. The print head of claim 5 further comprising a fifth base mounting surface configured to slidably interface with said pre-objective lens so as to maintain the optical axis of said pre-objective lens in parallel relationship to the optical path of said first optical radiation.

7. The print head of claim 6 wherein said fifth base mounting surface comprises a vee-shaped groove.

8. The print head of claim 1 wherein said first optical radiation source comprises a laser diode.

9. The print head of claim 1 wherein said first optical radiation source comprises a microlens.

10. The print head of claim 1 wherein said first collimating lens comprises a bi-convex element and a plano-cylindrical element.

11. The print head of claim 1 wherein said first optical radiation source further comprises a housing, said first collimating lens mounted within said housing so as to maintain optical alignment of said first collimating lens with said first optical radiation.

12. The print head of claim 11 wherein said housing further comprises a sleeve having at least a degree of freedom along the optical path of said first optical radiation, said first collimating lens mounted in said sleeve to provide for optical alignment of said first collimating lens with said first optical radiation.

13. The print head of claim 11 wherein said first base mounting surface comprises means to maintain the relative position of said housing to said first focusing lens.

14. The print head of claim 13 wherein said means to maintain the relative position of said housing to said first focusing lens comprises a vee-shaped groove.

15. The print head of claim 14 wherein said housing comprises at least a cylindrical surface configured so as to slidably interface with said vee-shaped groove.

16. The print head of claim 13 wherein said means to maintain the relative position of said housing to said first focusing lens comprises a stop surface disposed at an angle to the optical path of said first optical radiation.

17. The print head of claim 16 wherein said housing further comprises a flange configured so as to engage said stop surface.

18. The print head of claim 1 wherein said second base mounting surface comprises means to maintain the optical axis of said first focusing lens in parallel relationship to the optical path of said first optical radiation.

19. The print head of claim 18 wherein said means to maintain the optical axis of said first focusing lens comprises a planar surface and an opening extending through said planar surface.

20. An optical print head, suitable for use with a recording medium, said print head comprising:
    a print head base comprising a plurality of vee-shaped grooves;
    a plurality of optical radiation sources, each radiation source removably disposed within a corresponding said vee-shaped groove;
    a plurality of collimating lenses, each said collimating lens disposed in the optical path of radiation from a corresponding said radiation source;
    a plurality of focusing lens, each said focusing lens mounted to said print head base and disposed in the optical path of radiation from a corresponding said radiation source;
    a pre-objective lens disposed in the optical paths of said radiation;
    an objective lens disposed between said pre-objective lens and the recording medium; and,
    a plurality of mirror facets fixed with respect to said print head base, each said mirror facet disposed to reflect radiation from at least one said radiation source to said pre-objective lens in a substantially parallel bundle.

21. The print head of claim 20 wherein at least one said radiation source comprises a laser diode.

22. The print head of claim 20 wherein at least one said radiation source comprises a microlens.

23. The print head of claim 20 wherein at least one said collimating lens comprises a bi-convex element and a plano-cylindrical element.

* * * * *